March 21, 1933. J. J. KILPATRICK 1,902,560
SPINNER
Filed Oct. 27, 1931
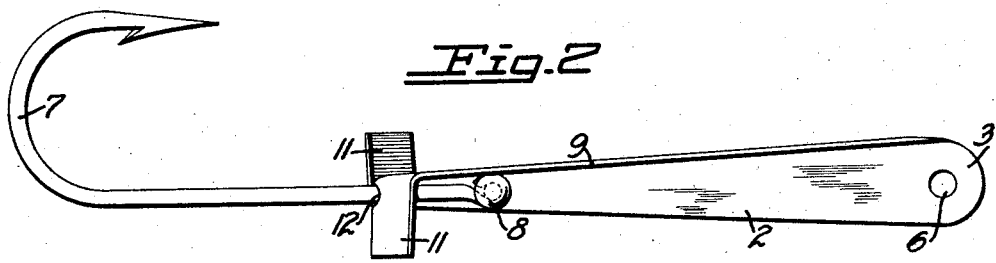
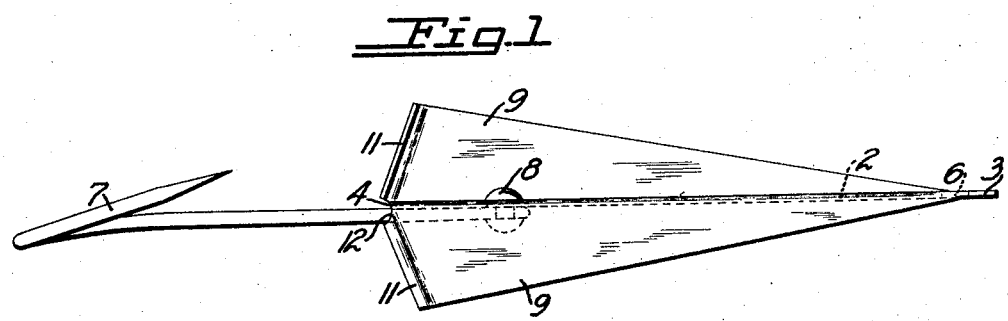
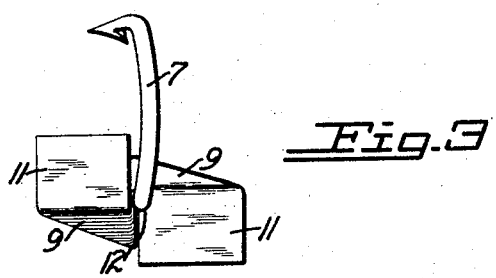
INVENTOR.
JOHN J. KILPATRICK.
BY Charles S. Evans
HIS ATTORNEY Patented Mar. 21, 1933

1,902,560

UNITED STATES PATENT OFFICE

JOHN J. KILPATRICK, OF SAN FRANCISCO, CALIFORNIA

SPINNER

Application filed October 27, 1931. Serial No. 571,303.

My invention relates to a fishing lure, and particularly to a spinner.

It is among the objects of my invention to provide a fishing lure or spinner which is attractive to game fish.

Another object of my invention is to provide a spinner which is positive and sure in its spinning action; a slow movement in the water being sufficient to effect rapid spinning thereof.

Still another object of my invention is to provide a spinner which will withstand heavy loading at the hook.

Further objects of my invention include the provision of a spinner which is of simple and rugged construction, and which will stand up under the abuses to which such devices are normally subjected under conditions of use.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a plan view showing the spinner embodying my invention.

Figure 2 is a side view of the spinner; and

Figure 3 is an end view of the same.

In terms of broad inclusion the spinner embodying my invention comprises a preferably tapered central web having an aperture adjacent its leading edge, and a hook secured adjacent its trailing edge. Oppositely extending and preferably tapered wing flanges are provided, and preferably project outwardly from the side edges of the central web. Oppositely extending and preferably angularly disposed end flanges are also provided, and preferably project outwardly from the trailing edges of the wing flanges.

In greater detail, the spinner embodying my invention is formed from a blank of sheet metal, such as copper, preferably plated on one side with a lighter colored metal, such as nickel. The blank is shaped and proportioned so that the various elements of the spinner may be formed by merely bending the blank. The spinner includes a central web portion 2, preferably tapering inwardly from a rounded leading edge 3 to the trailing edge 4. An aperture 6 is provided adjacent the leading edge of the web for purposes of connecting with the swivel of the trolling line, and a suitable hook 7 is secured adjacent the trailing edge of the web by a rivet 8 passing thru the eye of the hook and the body of the web.

A pair of oppositely extending and preferably tapered wing flanges 9 are provided, and preferably project outwardly from the side edges of the web 2. These wing flanges are formed by bending portions of the blank outwardly from the side edges of the central web portion 2; the wing flanges 9 being preferably bent outwardly at an angle of 90° from the web. A pair of oppositely extending and preferably angularly disposed end flanges 11 are also provided. These flanges are also formed by bending out portions of the blank, and preferably project outwardly from the trailing edges of the wing flanges. As best shown in Figure 1, the end flanges 11 are positioned in a V-like formation, and, as best shown in Figure 2, are tipped back slightly from the vertical. This positioning of the end flanges gives the lure its spinning motion when it is drawn thru the water. The end flange adjacent the hook 7 is provided with a circular recess 12 adapted to partially encircle the hook shank. This holding means together with the rivet 8 firmly secures the hook.

In conclusion it is pointed out that the spinner embodying my invention is positive and sure in its spinning action; a slow movement in the water being sufficient to effect rapid spinning. The lure will spin even when hampered by accumulations of foreign matter in quantities sufficient to block the action of an ordinary spinner or spoon. The lure is particularly strong and will withstand heavy loading at the hook. Furthermore, the spinner is of simple and rugged construction, and will stand up under the abuses to which such devices are normally subjected under conditions of use.

I claim:

1. A spinner comprising a central web having an aperture adjacent its leading edge, a hook secured adjacent the trailing edge of the web, a pair of oppositely extending wing flanges projecting outwardly from the side edges of the web, and a pair of oppositely extending end flanges projecting outwardly from the trailing edges of the wing flanges.

2. A spinner comprising a central web having an aperture adjacent its leading edge, a hook secured adjacent the trailing edge of the web, a pair of oppositely extending wing flanges projecting outwardly from the side edges of the web, and a pair of oppositely extending and angularly disposed end flanges projecting outwardly from the trailing edges of the wing flanges.

3. A spinner comprising a tapered central web having an aperture adjacent its leading edge, a hook secured adjacent the trailing edge of the web, a pair of oppositely extending tapered wing flanges projecting outwardly from the side edges of the web, and a pair of oppositely extending end flanges projecting outwardly from the trailing edges of the wing flanges.

In testimony whereof I have hereunto set my hand.

JOHN J. KILPATRICK.